STEVENSON & CRIDER.
Grain Cleaner.
No. 55,174. Patented May 29, 1866.
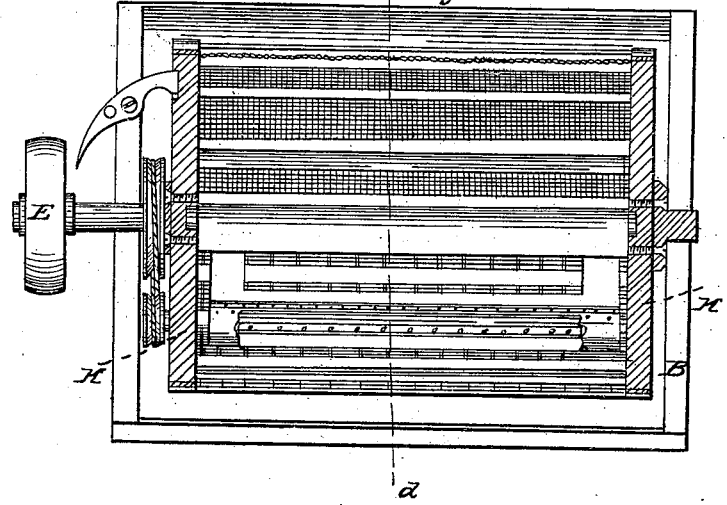
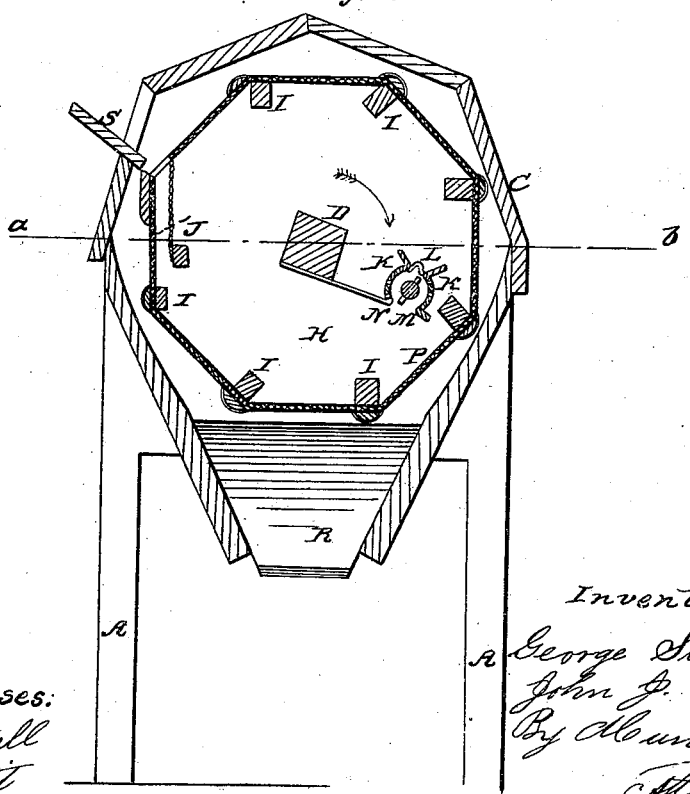
Witnesses:
O. F. Hall
C. A. Pettit
Inventor:
George Stevenson
John P. Crider
By Munn & Co
Attorneys

UNITED STATES PATENT OFFICE.

GEO. STEVENSON, OF ZIONSVILLE, AND JOHN J. CRIDER, OF GREENFIELD, INDIANA.

IMPROVEMENT IN GRAIN-CLEANERS.

Specification forming part of Letters Patent No. 55,174, dated May 29, 1866.

*To all whom it may concern:*

Be it known that we, GEORGE STEVENSON, of Zionsville, in the county of Boone, State of Indiana, and JOHN J. CRIDER, of Greenfield, in the county of Hancock, State of Indiana, have made new and useful Improvements in Grain-Cleaners; and we do hereby declare the following to be a full, clear, and exact description of the nature, construction, and operation of the same, sufficient to enable one skilled in the art to which it is allied to construct and use the same, reference being had to the accompanying drawings, which are made part of this specification, and in which—

Figure 1 is a section on the line $a\ b$, Fig. 2. Fig. 2 is a vertical section on the line $c\ d$, Fig. 1.

The improvement consists of a machine for cleaning grain by the removal from it of the offal, dust, or smut, to prepare it either for grinding or for seed. By offal we mean the seeds of weeds, such as cockle, cheat, grass, &c., which seeds find their way through the meshes of the screen.

The rust, dust, and smut which adhere to the grain are rubbed off by means of the auxiliary rubbing-cylinder, and subsequently driven out of the machine by the blast of air generated by the circular motion of the screen.

In the drawings, A A are the legs, and B the frame which supports the casing C and drum I I P P and shaft D. The drum is revolved within the chamber C by a belt upon the pulley E and by means of the pulleys F G, and the cord upon them rotates the brush-shaft N within the open-sided cylinder K K.

The drum consists of ends H H and ribs I I, a reticulated or wire-cloth surface being stretched thereon, and as it revolves in the deviation of the arrow the smaller grain and seed will find their way through the meshes and escape through the hopper R. The grain, of course, will seek the lowest position, and as the cylinder or case K K ascends the grain will be caught by the open mouth M, and caused to pass in contact with the brushes of the shaft N and the perforated sides of the casing K. The brush-cylinder revolves with considerable speed and cleans the dust, &c., from the grain.

The grain is introduced into the drum through the spout S and opening J when in the position shown at Fig. 2, and is discharged by the revolution of the shaft in the direction contrary to that shown by the arrow.

O is a stop or check to maintain the drum in a stationary position while being filled.

Having described our invention, what we claim therein as new, and desire to secure by Letters Patent, is—

The combination of the outer drum-screen and the inner casing, K K, provided with a revolving brush, the whole constructed and operated substantially as described and represented.

To the above specification for an improved grain-cleaner we have signed our hands this 8th day of March, 1866.

GEORGE STEVENSON.
J. J. CRIDER.

Witnesses:
W. F. HALL,
JAMES L. EWIN.